(12) United States Patent
Kim (10) Patent No.: US 6,205,338 B1
(45) Date of Patent: Mar. 20, 2001

(54) INTERCOMMUNICATION METHOD BETWEEN PORTABLE UNITS IN TDMA CORDLESS TELEPHONE SYSTEM

(75) Inventor: Ju-Nyun Kim, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/134,011

(22) Filed: Aug. 14, 1998

(30) Foreign Application Priority Data

Aug. 14, 1997 (KR) .................................................. 97/38835

(51) Int. Cl.$^7$ ....................................................... H04Q 7/20
(52) U.S. Cl. ............................ 455/462; 455/465; 455/518
(58) Field of Search .................................... 455/421, 422, 455/426, 433, 434, 435, 436, 440, 444, 456, 457, 462, 465, 518, 519, 513, 423, 11.1, 450; 370/282, 347

(56) References Cited

U.S. PATENT DOCUMENTS

| | | | | |
|---|---|---|---|---|
| 4,965,849 | * | 10/1990 | Kunihiro | 455/463 |
| 5,058,151 | * | 10/1991 | Tanaka et al. | 455/462 |
| 5,371,783 | * | 12/1994 | Rose et al. | 455/462 |
| 5,517,551 | * | 5/1996 | Arai | 455/575 |
| 5,812,951 | * | 9/1998 | Ganesan et al. | 455/445 |
| 5,911,120 | * | 6/1999 | Jarett et al. | 455/417 |
| 5,940,766 | * | 8/1999 | Uratani | 455/465 |
| 5,987,318 | * | 11/1999 | Alperovich et al. | 455/416 |
| 6,044,268 | * | 3/2000 | Haartsen | 455/426 |
| 6,052,407 | * | 4/2000 | Ciccone et al. | 375/202 |
| 6,052,565 | * | 4/2000 | Ishikura et al. | 455/423 |

* cited by examiner

Primary Examiner—Dwayne D. Bost
Assistant Examiner—Jean A Gelin
(74) Attorney, Agent, or Firm—Dilworth & Barrese, LLP (57) ABSTRACT

An intercommunication method between portable units in a TDMA (Time Division Multiple Access) cordless telephone system. In an embodiment of the present invention, it is determined whether a portable unit is positioned in the propagation area of a base unit upon an intercom request from the portable unit. A time reversal is then performed when the portable unit is out of the propagation area of the base unit. Time slots are designated for intercommunication between the portable unit and a portable unit to be called and an intercom call signal is transmitted in the designated time slots. When a called party responds to the intercom call signal, a speech mode is performed. Upon termination of the intercom call, the reversed time is reversed again to recover the original state. In another embodiment, it is determined whether a portable unit is positioned in the propagation area of a base unit upon an intercom request from the portable unit. Time slots are designated for intercommunication between the portable unit and a portable unit to be called when the portable unit is out of the propagation area of the base unit, and an intercom call signal is transmitted in the designated time slots. When a called party responds to the intercom call signal, the speech mode is performed.

10 Claims, 9 Drawing Sheets

INTERCOMMUNICATION METHOD BETWEEN PORTABLE UNITS IN TDMA CORDLESS TELEPHONE SYSTEM

BACKGROUND OF THE INVENTION

1. Field of the Invention

The present invention relates to TDMA (Time Division Multiple Access) cordless telephone systems, and in particular, to an intercommunication method between portable units.

2. Description of the Related Art

In general, a cordless telephone system is provided with a cordless base unit (referred to as base unit) and a plurality of cordless portable units (referred to as portable units). Recently, many users have registered two or more portable units with a base unit in the cordless telephone system. This cordless telephone system offers the function of an intercommunication between portable units. That is, voice communication between a calling portable unit and a remotely located called portable unit. This intercommunication is available via the base unit and will be described below with reference to FIG. 1.

Figure 1:
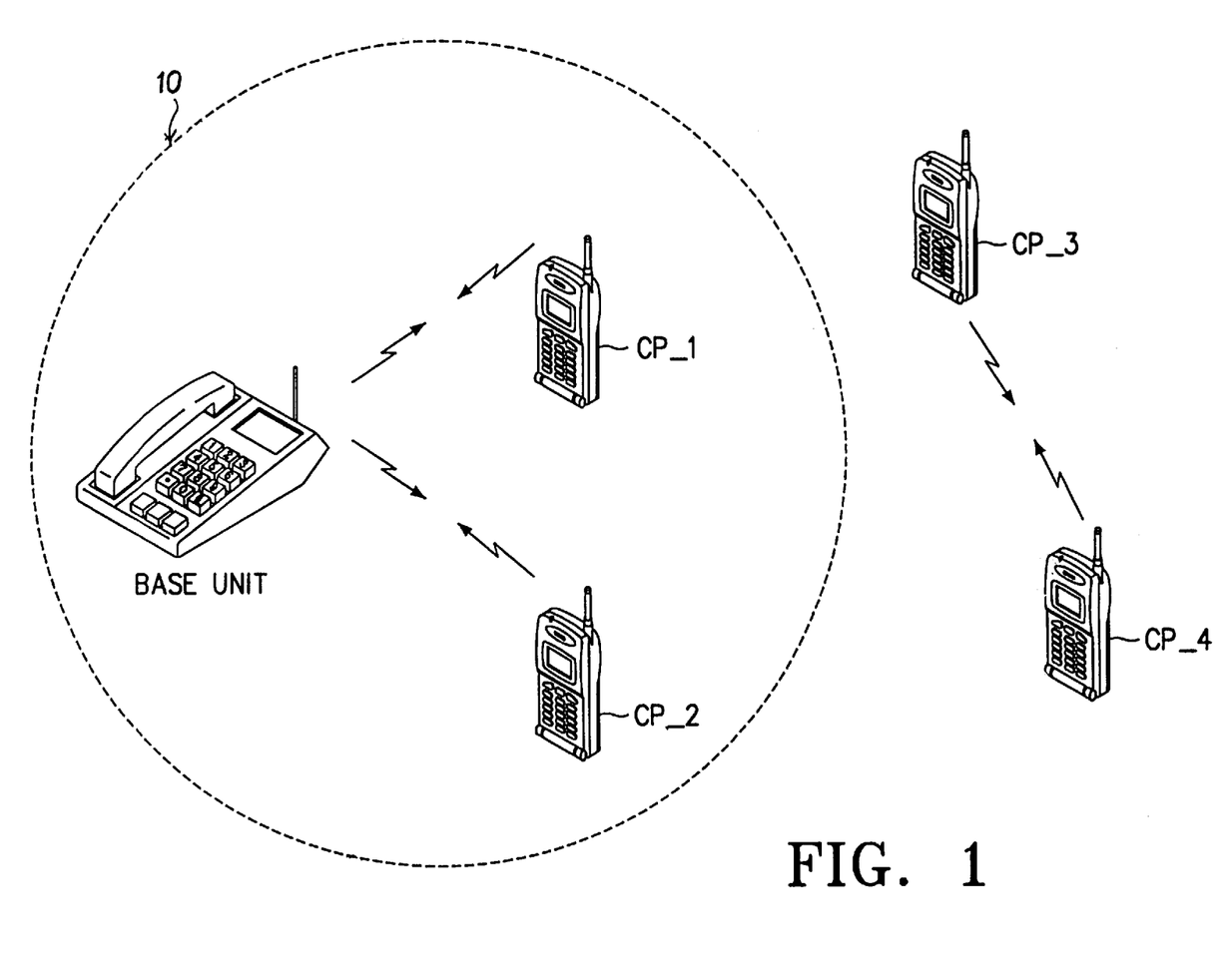
FIG. 1 illustrates a base unit and a plurality of portable units registered with the base unit in a cordless telephone system.

FIG. 1 illustrates a base unit and a plurality of portable units (four portable units here) registered with the base unit in a cordless telephone system. Two portable units CP_1 and CP_2 are positioned within a propagation area (or coverage area) 10 of a radio signal transmitted from the base unit, and two portable units CP_3 and CP_4 are located beyond the propagation area. The base unit is connected to or disconnected from a main line (i.e., tip and ring terminals) depending on an off- or on-hook state. Upon connection to the main line, the base unit performs communication through a telephone wire. Upon reception of a call request from a portable unit, the base unit connects the portable unit to the main line for voice communication, and wirelessly transfers a signal received through the wire to the portable unit. Therefore, a portable unit intercommunicates with another portable unit or communicates with an external user on the public telephone network by way of radio communication with the base unit.

An example of the intercommunication in a TDMA cordless telephone system is as follows. When the first portable unit CP_1 within the propagation area is to call the second portable unit CP_2 also within the propagation area, the first portable unit CP_1 designates time slots to communicate with the base unit and sends a signal to the base unit in the time slots requesting a call to the second portable unit CP_2. Then, the base unit designates time slots unoccupied by the first portable unit CP_1 and calls the second portable unit CP_2 in the newly designated time slots. The second portable unit CP_2 receives a ring signal and can communicate with the base unit when a user has the second portable unit CP_2 off hook. The base unit transmits data received from the second portable unit CP_2 to the first portable unit CP_1 in the time slots designated for the first portable unit CP_1. Thus, intercommunication between the portable units can be conducted.

However, the conventional intercommunication method has a shortcoming in that portable units beyond the propagation area of the base unit cannot intercommunicate with each other in a TDMA cordless telephone system because there is no base unit for transferring a call between them.

SUMMARY OF THE INVENTION

Therefore, an object of the present invention is to provide a method for conducting intercommunication between portable units located beyond a radio signal propagation area in a cordless telephone system.

To achieve the above object, there is provided an intercommunication method between portable units in a TDMA (Time Division Multiple Access) cordless telephone system. According to one aspect of the present invention, it is determined whether a portable unit is positioned in the propagation area of a base unit upon an intercom request from the portable unit. A time reversal is performed when the portable unit is out of the propagation area of the base unit and time slots are designated for intercommunication between the portable unit and a portable unit to be called. An intercom call signal is then transmitted in the designated time slots. When a called party responds to the intercom call signal, a speech mode is performed. Upon termination of the intercom call, the reversed time is reversed again to recover the original state.

According to another aspect of the present invention, it is determined whether a portable unit is positioned in the propagation area of a base unit upon an intercom request from the portable unit. Time slots are designated for intercommunication between the portable unit and a portable unit to be called when the portable unit is out of the propagation area of the base unit, and an intercom call signal is transmitted in the designated time slots. When a called party responds to the intercom call signal, a speech mode is performed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Figure 2:
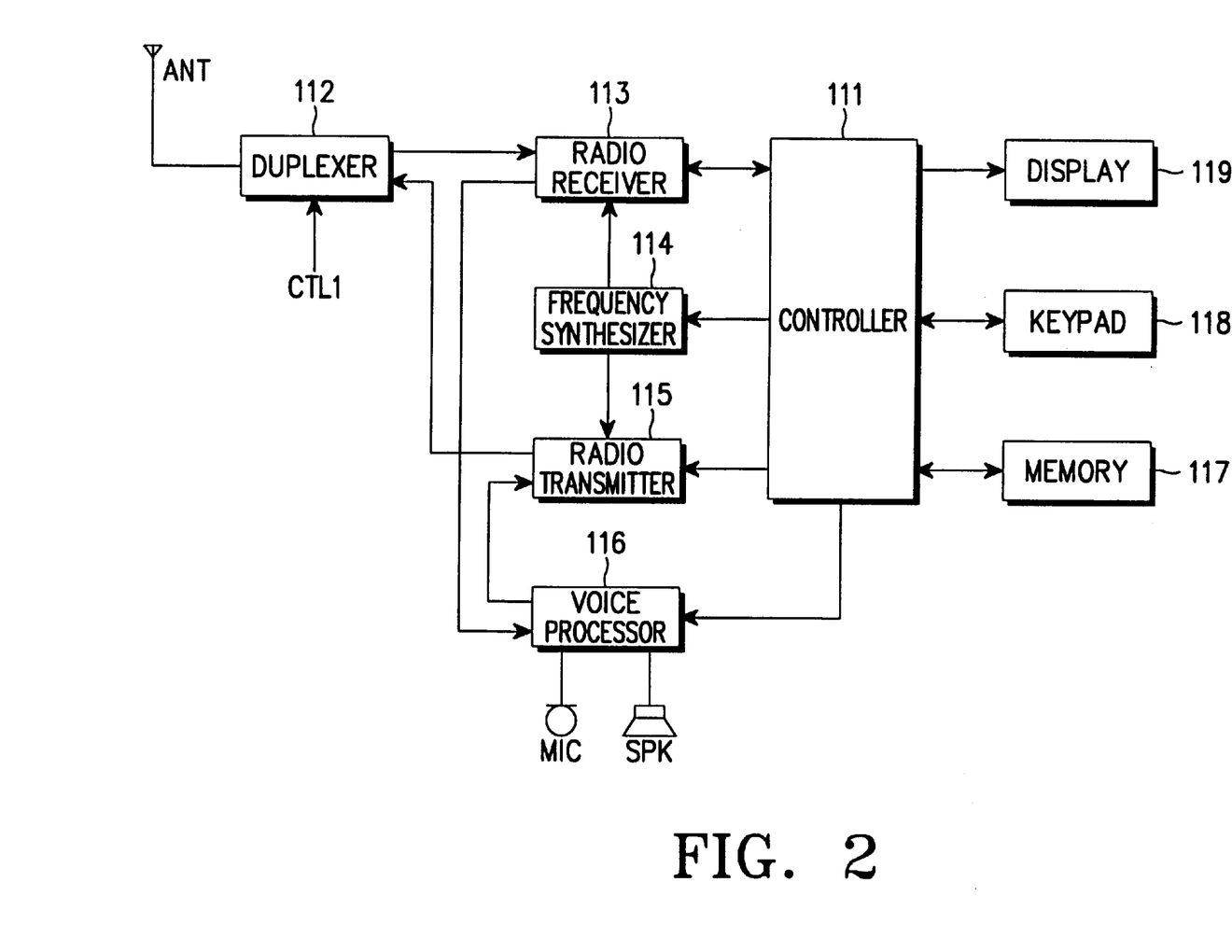
FIG. 2 is a block diagram of a portable unit in a TDMA cordless telephone system, to which the present invention is applied.

FIG. 2 is a block diagram of a portable unit shown in FIG. 1. A controller 111 controls the entire operation of the portable unit, especially a direct intercommunication between portable units located outside of the propagation area 10. A duplexer 112 sends radio data received via an antenna ANT to a radio receiver 113 and radio data received from a radio transmitter to the antenna ANT, under the control of the controller 111. Transmit and receive signals and data are duplexed in time slots in the portable unit using TDMA The radio receiver 113 receives a call connection signal for establishing a communication link under the control of controller 111 and feeds the call connection signal to controller 111. In a speech mode, radio receiver 113 outputs a radio-received voice signal in a local oscillation frequency received from a frequency synthesizer 114 to a voice processor 116. The frequency synthesizer 114 generates the local oscillation frequency under the control of controller 111 and applies the local oscillation frequency to radio receiver 113 and radio transmitter 115. The radio transmitter 115 outputs a voice signal received from voice processor 116 in the local oscillation frequency received from frequency synthesizer 114 to duplexer 112.

The voice processor 116 converts the voice data received from radio transmitter 113 to an electrical voice signal under the control of controller 111. A speaker SPK converts the voice signal received from voice processor 116 to an audible sound. The voice processor 116 converts an electrical voice signal received from a microphone MIC to voice data through coding, and outputs the voice data to radio transmitter 115. A memory 117 includes a program memory (not shown) for storing programs needed to operate the portable unit and a data memory (not shown) for storing data generated during the control operation. The program memory and the data memory may be a non-volatile one and a volatile one, respectively. A keypad 118, provided with digit keys for dialling (not shown) and a plurality of function keys (not shown), applies a key input signal to controller 111 corresponding to a key pressed by a user. The keypad 118 also has an intercom key for intercommunication between portable units according to the present invention. A display 119 displays the operation and states of the portable unit under the control of the controller 111.

Figure 3:
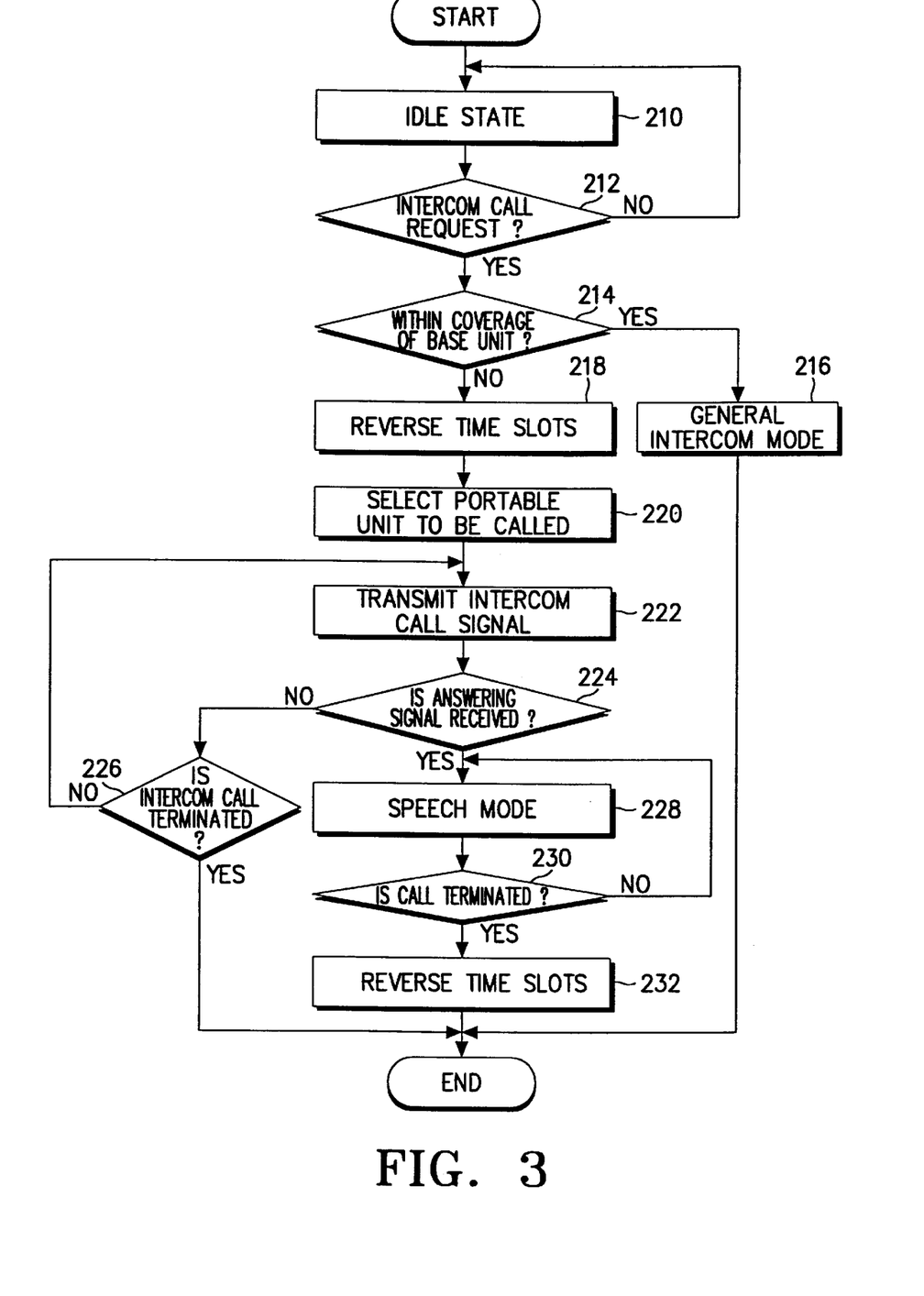
FIG. 3 is a flowchart for controlling a direct intercommunication between portable units according to an embodiment of the present invention.

FIG. 3 is a flowchart for controlling a direct intercommunication between portable units according to an embodiment of the present invention. This intercommunication will be described in detail with reference to FIGS. 1, 2, and 3. The controller 111 is kept in an idle state (step 210) and determines whether an intercom key of keypad 118 has been pressed (step 212). Upon input of the intercom key, controller 111 determines whether the portable unit is positioned within the propagation area of a base unit through radio receiver 113, frequency synthesizer 114, and radio transmitter 115. There are many ways to check the presence or absence of the portable unit within the propagation area. For exemplary purposes and understanding, two ways will be discussed here: one is to send an intercommunication request signal to the base unit by controlling radio transmitter 115 and frequency synthesizer 114, and determine whether the radio receiver 113 receives a response signal (or answering signal) from the base unit within a predetermined time; and the other is to check the strength of signals received from the base unit by continuously scanning the time slots of transmission and reception times for signal reception, and in the absence of the signals received from the base unit, determine that the portable unit is out of the propagation area. By using these methods, it can be determined that the first and second portable units CP_1 and CP_2 are within the propagation area 10 and the third and fourth portable units CP_3 and CP_4 are beyond the propagation area 10.

In an embodiment of the present invention, the presence or absence of the portable unit in the propagation area is checked using the first method. When the portable unit is within the propagation area (step 214), controller 111 performs a general intercommunication mode in step 216. Otherwise, controller 111 reverses the order of a reception time Rx and a transmission time Tx assigned to the portable unit by controlling radio receiver 113, frequency synthesizer 114, and radio transmitter 115. Reversing of the order in which the reception time Rx and the transmission time Tx are arranged will be referred to as time reversal.

Figure 4:
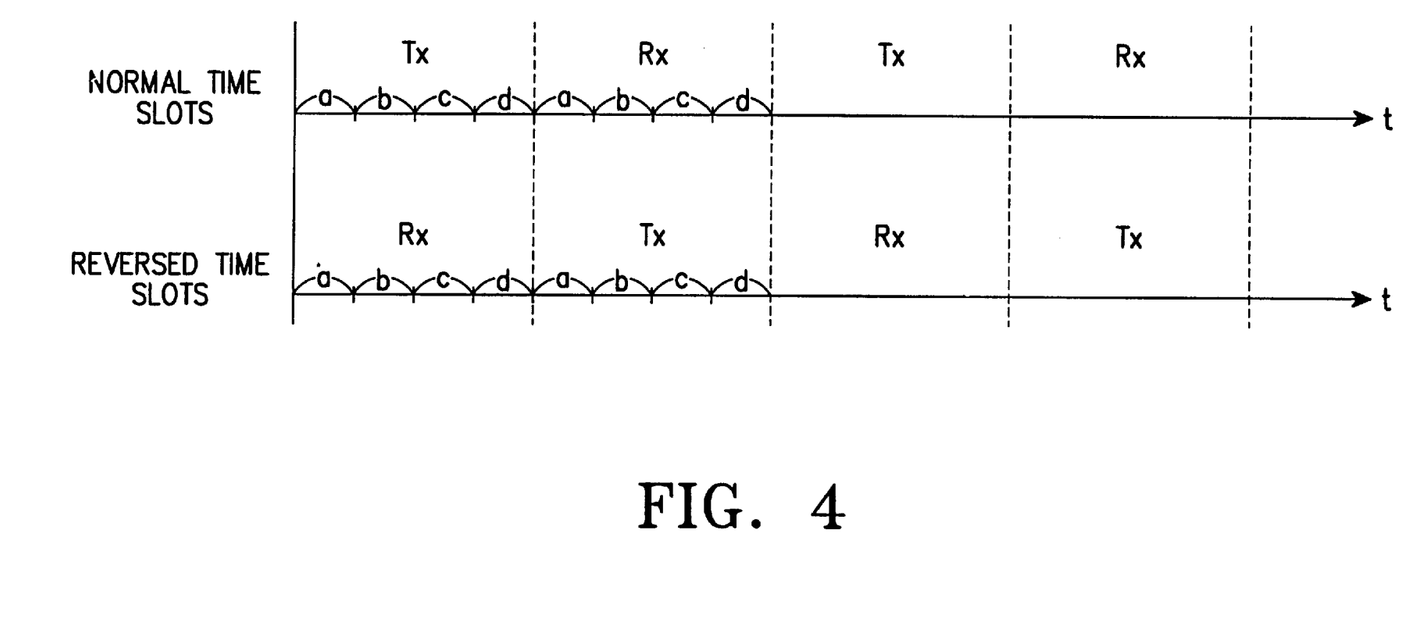
FIG. 4 illustrates normal time slots and reversed time slots according to an embodiment of the present invention.

FIG. 4 illustrates normal time slots and reversed time slots according to an embodiment of the present invention. In the normal state, the transmission time Tx precedes the reception time Rx with at least two time slots assigned respectively in the transmission time Tx and the reception time Rx. Although four respective transmission and reception time slots are shown in FIG. 4 for clarity of description, twelve time slots are assigned to the transmission time Tx and the reception time Rx, respectively, in an actual TDMA cordless telephone system. The same time slots are assigned for transmission and reception during actual communication. That is, when time slot a is assigned as a transmission time slot, the time slot a is also assigned as a reception time slot. In the case of time reversal, the normal transmission and reception times Tx and Rx are exchanged in order. Despite time reversal, the order of time slots is not changed. In other words, if the transmission time slots are arranged in the order of a-b-c-d, they become reception time slots of the same order in time reversal.

Referring again to FIG. 3, after time reversal in step 218, controller 111 displays the other available portable units registered with the base unit on display 119 (step 220). The information of the other portable units is stored in memory 117, which will be described in detail later with reference to FIG. 6. The controller 111 selects a portable unit for intercommunication according to key data received from keypad 118. Here, if two portable units are registered with the base unit, the portable unit selecting procedure may be omitted. In step 222, controller 111 sends an intercom call signal in designated time slots to the selected portable unit by controlling radio transmitter 115 and frequency synthesizer 114. The controller 111 then determines whether a response signal is received from the called portable unit (step 224). The response signal is generated when the called portable unit goes off hook in response to the intercom call signal by its user. Upon reception of a response signal in step 224, controller 111 proceeds to the speech mode (step 228). If no response signal is received, (step 224), controller 111 determines whether an intercom call termination signal is received (step 226). Upon reception of the intercom call termination signal in step 226, the procedure is completed. Otherwise, the procedure returns to step 222.

When the response signal is received (step 224), controller 11 performs a speech mode between the calling portable unit and the called portable unit (step 228). For this purpose, time reversal is implemented in step 218 so that the transmission time Tx of the called portable unit is the reception time Rx of the calling portable unit and vice versa. Thus, the calling portable unit selects one of the reversed transmission time slots and sends an intercom call signal in the selected time slot to the called portable unit. Then, the called portable unit is set in the reception time Rx because it uses normal time slots. Therefore, the called portable unit receives the intercom call signal in the time slot selected by the calling portable unit. When a user of the called portable unit answers the call, intercommunication is conducted between the portable units in the time slot in which the intercom call signal and an intercom response signal have been transferred.

Referring to FIG. 3, after the speech mode in step 228, controller 111 determines whether a call termination signal is received in the keypad 118 or radio receiver 113 (step 230). Upon reception of the call termination signal, controller 111 goes to step 232. In step 232, controller 111 returns the reversed time slots to the original time slots by reversing the transmission and reception times previously reversed in step 218. If no call termination signal is received (step 230), controller 111 continues to operate the speech mode (step 228).

Figure 5:
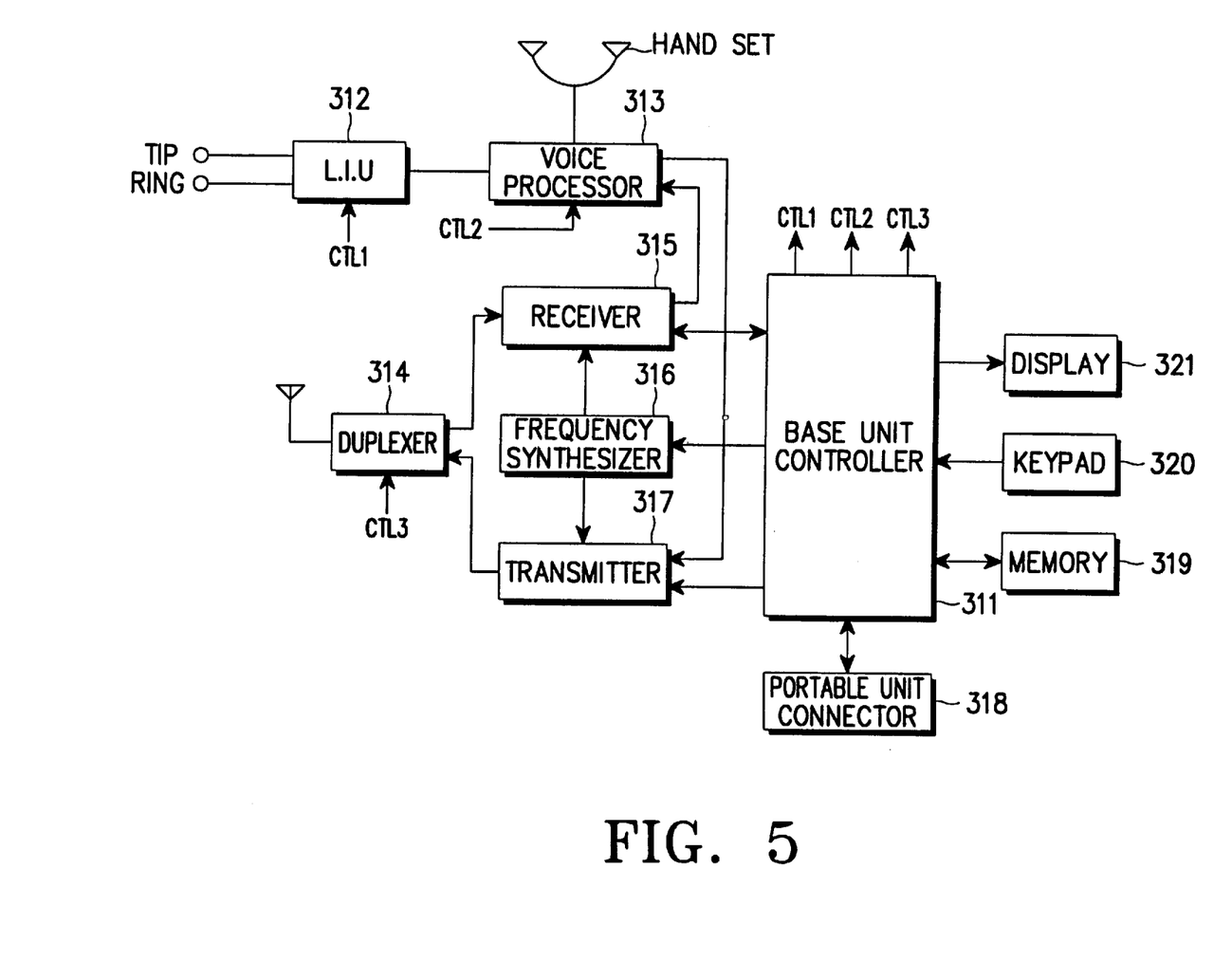
FIG. 5 is a block diagram of a base unit in the cordless telephone system.

FIG. 5 is a block diagram of the base unit in the TDMA cordless telephone system. Referring to FIG. 5, a base unit controller 311 controls the entire operation of the cordless telephone system, especially, providing information on a new portable unit to existing portable units when the new portable unit is registered. A line interface unit (LIU) 312 is connected to or disconnected from a telephone line (i.e., tip and ring terminals) under the control of the controller 311 or by a hook switch (not shown). A voice processor 313 encodes or decodes voice transmitted and received during a voice communication under the control of base unit controller 311. The voice communication may be conducted through LIU 312 or with a portable unit via radio modules.

The structure and operation of the radio modules will be described below. A duplexer 314 feeds radio data received from an antenna ANT to a receiver 315 and radio data received from a transmitter 317 to the antenna ANT under the control of the base unit controller 311. Transmit and receive signals and data are duplexed in time slots since the base unit employs TDMA. The receiver 315 operates under the control of controller 311 and applies a calling signal received from duplexer 314 to controller 311. In a speech mode, receiver 315 feeds a radio-received voice signal in a local oscillation frequency received from a frequency synthesizer 316 to the voice processor 313. The frequency synthesizer 316 generates the local oscillation frequency under the control of base unit controller 311 and outputs the local oscillation frequency to receiver 315 and transmitter 317. The transmitter 317 outputs the signal received from voice processor 313 in the local oscillation frequency received from frequency synthesizer 316 to duplexer 112.

A portable unit connector 318 is connected to a portable unit, for charging a battery of the portable unit. A memory 319 includes a program memory (not shown) for storing control data needed for the control operation of the base unit controller 311, and a data memory (not shown) for storing data generated during the control operation, especially data of a portable unit upon registration of the portable unit with the base unit. A keypad 320, having digit keys for dialling (not shown) and function keys (not shown), generates a key input signal upon user input of a key and applies the key input signal to the base unit controller 311. A display 321 displays the operation or status of the base unit under the control of the base unit controller 311.

Figure 6:
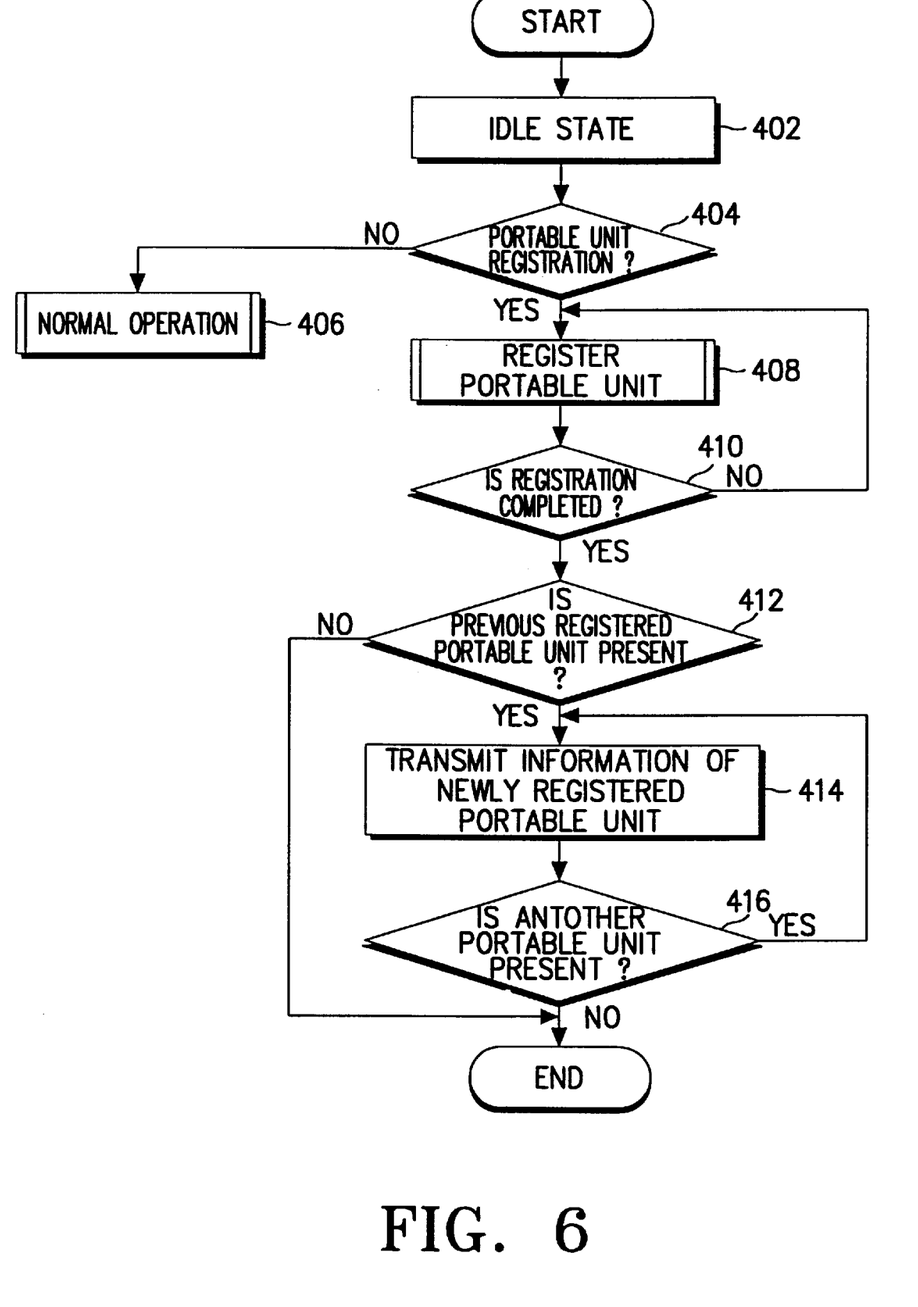
FIG. 6 is a flowchart for controlling registration of a portable unit according to the present invention.

FIG. 6 is a flowchart for controlling the registration of a portable unit according to the present invention. Referring to FIGS. 5 and 6, there will hereinbelow be given a detailed description of registration of a portable unit and then transfer of information on the newly registered portable unit to other existing registered portable units. The base unit controller 311 is kept in an idle state (step 402). Upon generation of a key input signal in the keypad 320, controller 311 determines whether the key input signal is for registration of a portable unit (step 404). If the key input signal indicates registration of a new portable unit, base unit controller 311 proceeds to the registration (step 408). If the key input signal is not indicative of registration, base unit controller 111 performs a normal operation (step 406). In step 408, base unit controller 311 registers the portable unit. Here, the portable unit registration is implemented in the same manner as that for registration of a general portable unit, but further involves transmission of information on previously registered portable units, if they exist, to the newly registered portable unit. The information relating to the existing portable units represents their codes and numbers registered in the base unit. A portable unit code is a unique code owned by a specific portable unit, and a portable unit number is the number allocated to the portable unit according to the order in which it is registered. The portable unit information may be a unique code or a registration number alone. An exemplary portable unit registration table including portable unit information is given as follows:

TABLE 1

| portable unit | unique code | registration number |
|---|---|---|
| CP_1 | 157 D77 CA | 01 |
| CP_2 | 157 CA3 30 | 02 |
| CP_3 | 155 FF6 88 | 03 |
| CP_4 | 156 BCC 65 | 04 |

In step 410, the base unit controller 311 checks whether the portable unit is completely registered. Upon completion of the registration, the procedure goes to step 412 and, otherwise, it returns to step 408. The base unit controller 311 determines whether there is a previously registered portable unit, referring to the portable unit registration table, in step 412. In the presence of a previously registered portable unit, the base unit controller 311 goes to step 414. In the absence of a previously registered portable unit, the procedure ends. In step 414, base unit controller 311 transfers the information (i.e., unique code and registration number) of the newly registered portable unit to the previously registered portable unit. When the information is completely transferred, the base unit controller 311 determines whether there remains another previously registered portable unit (step 416). If there is another previously registered portable unit, the procedure returns to step 414. If there are no more previously registered portable units, the procedure ends.

For example, if the first portable unit CP_1 of table 1 is registered with the base unit, the base unit controller 311 does not transfer the information of other portable units to the first portable unit CP_1 in step 408 because the first portable unit CP_1 is the first one to be registered. Upon completion of the registration, the base unit controller 311 determines whether there are previously registered portable units referring to the portable unit registration table in step 412. Since there is no previously registered portable unit, the procedure ends. On the other hand, in the case of the third portable unit CP_3, the third portable unit CP_3 is registered and the unique codes and registration numbers of the previously registered portable units CP_1 and CP_2 read from the portable unit registration table are transmitted to the third portable unit CP_3, in step 408. Thus, the third portable unit CP_3 stores the received information of the first and second portable units CP_1 and CP_2 in the memory 117 shown in FIG. 2. When the registration is completed, base unit controller 311 checks the portable unit registration table. In the absence of the previously registered portable units, the base unit controller 311 calls the first portable unit CP_1 and sends the information of the third portable unit CP_3 to the first portable unit CP_1 (step 414). The base unit controller 311 determines whether there is another previously registered portable unit (step 416). Because of the existence of the second portable unit CP_2, the base unit controller 311 sends the information of the third portable unit CP_3 to the second portable unit CP_2 (step 414). Hence, each portable unit shares the information of the other portable units. Now, reception of the information on a portable unit in another one will be described in detail, referring to FIG. 7.

Figure 7:
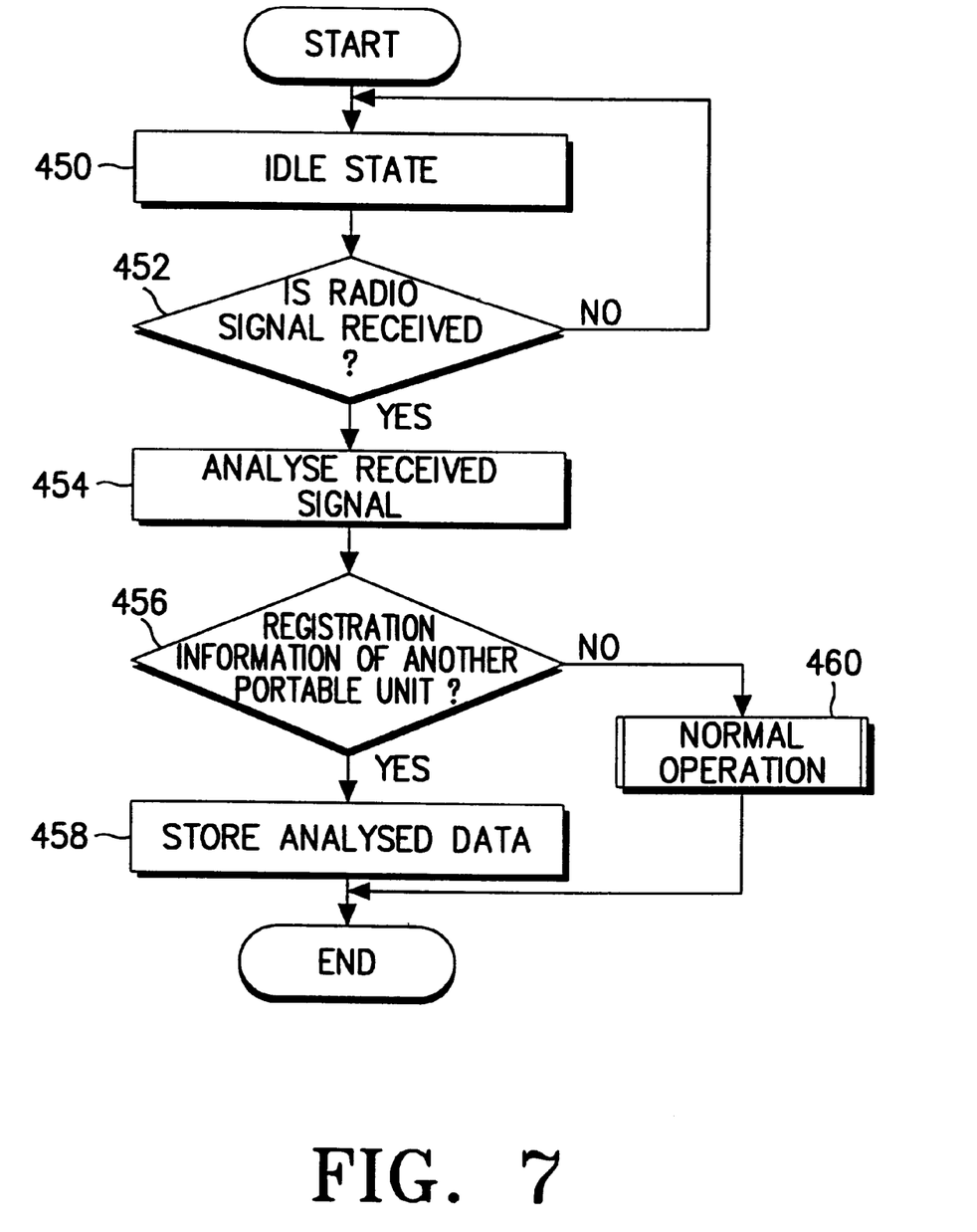
FIG. 7 is a flowchart for controlling a portable unit to receive registration information of another portable unit.

FIG. 7 is a flowchart for controlling a portable unit to receive the information relating to another portable unit. Referring to FIGS. 1 to 7, the controller 111 is kept in an idle state (step 450), and determines whether a radio signal is received in the radio receiver (step 452). When no radio signal is received, the procedures goes back to step 450. Upon input of a radio signal, controller 111 analyses the radio signal (step 454) and determines whether the radio signal represents the registration information of a different portable unit in step 456. If the radio signal is not the registration information of the different portable unit, controller 111 performs a normal operation (step 460) and the procedure ends. On the contrary, if the radio signal represents the registration information of the different portable unit, controller 111 stores the analysed data in memory 117 (step 458). The data registered in the memory 117 is the same as shown in the portable unit registration table of table 1. Through the steps of FIGS. 6 and 7, each portable unit shares the information of the other portable units registered in the base unit.

Figure 8:
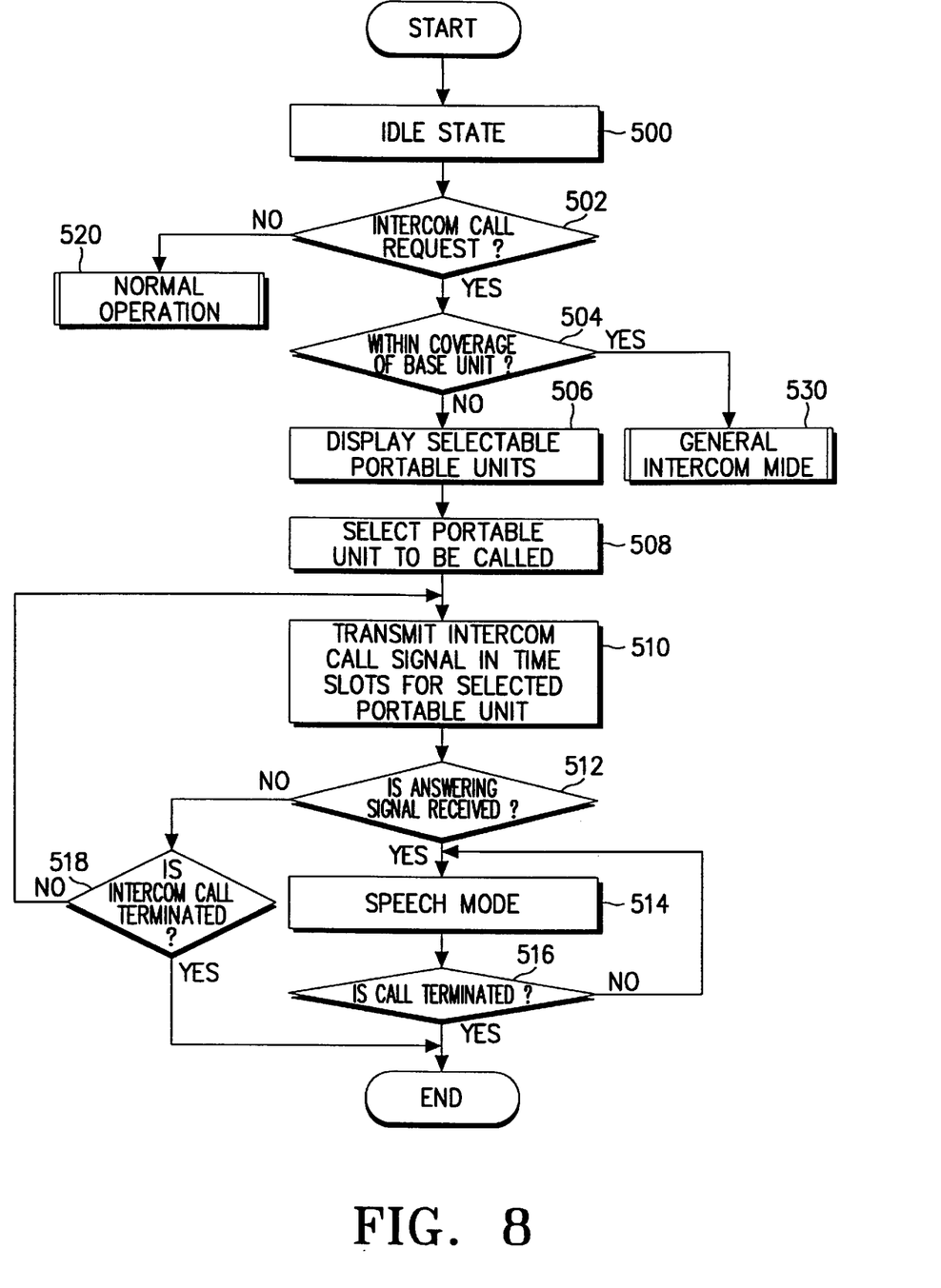
FIG. 8 is a flowchart for controlling intercommunication between portable units according to another embodiment of the present invention.

FIG. 8 is a flowchart for controlling an intercommunication between portable units according to another embodiment of the present invention. Referring to FIGS. 1 to 8, time slot assignment for intercommunication between portable units will be described in detail. The controller 111 is kept in an idle state in step 500. Upon reception of a key input signal from keypad 118, controller 111 determines whether the input key signal is an intercom key signal (step 502). When it is not the intercom key signal, controller 111 performs a normal operation (step 520). Upon input of the intercom key, controller 111 determines whether the portable unit is positioned in the propagation area of the base unit (step 504). Here, the presence or absence of the portable unit within the propagation area 10 of the base unit is determined by the second method described with reference to FIG. 3. That is, the strengths of signals received from the base unit are checked and if there is no signal received from the base unit, the portable unit is determined to be out of the propagation area. Therefore, the portable unit beyond the propagation area of the base unit checks all the time slots of its transmission and reception times Tx and Rx, respectively. If the portable unit is located within the propagation area 10 of the base unit, controller 111 performs a general intercommunication mode (step 530). If the portable unit is determined to be out of the propagation area 10, controller 111 displays selectable portable units on the display 119 (step 506). Here, the selectable portable units displays the codes of the other portable units in the portable unit registration table in digits or characters corresponding to the codes. For example, the first portable unit CP_1 may be displayed as portable unit #1 or CP_1 on the display 119.

Then, controller 111 selects a portable unit to be called depending on an key input signal received from keypad 118 (step 508). Then, the controller 111 reads ID corresponding to a portable unit to be called among IDs of respective portable units, which are stored on the memory 117 of the portable units corresponding to the portable units registered in the base unit in the process of the above FIG. 6 and FIG. 7. Further, the controller generates data necessary for intercommunication to be transmitted, in which ID corresponding to the selected portable unit is added. In step 510, controller 111 designates time slots to communicate with the selected portable unit, and transmits to the selected portable unit the same calling signal as would be output from the base unit if the intercommunication is conducted via the base unit in the designated time slots by controlling frequency synthesizer 114 and radio transmitter 115 (step 510). Through the foregoing process, the receiving portable unit detects portion only storing ID corresponding to the portable unit to be called among calling signal received from the transmitting portable unit, thereby determine whether the receiving portable unit is called. The same is true of a case in which a base unit calls a portable unit.

Assuming that the third portable unit CP_3 attempts a call to the fourth portable unit CP_4, they check all the time slots to determine whether data is received because they are out of the propagation area of the base unit. Upon input of an intercom key in step 502, the third portable unit CP_3 is determined to be beyond the propagation area (step 504). Controller 111 then displays selectable portable units on the display 119 (step 506). If the fourth portable unit CP_4 is selected in step 508, controller 111 designates time slots for use in a call attempt, and the third portable unit CP_3 sends a calling signal to the fourth portable unit CP_4 in the selected time slots, acting as the base unit (step 510). The fourth portable unit CP_4 designates the time slots in which the third portable unit CP_3 sends the signal as reception time slots. Therefore, the transmission slots for the third portable unit CP_3 and the reception time slots for the fourth portable unit CP_4 are designated by the third portable unit CP_3.

Referring to FIG. 8, the controller 111 determines whether a response signal is received in radio receiver 113 by controlling radio receiver 113 and frequency synthesizer 114 (step 512). In the presence of the response signal, the procedure goes to the speech mode (step 514), and otherwise, it goes to step 518. In step 518, the controller determines whether a key input signal for terminating the intercommunication is received in keypad 118. Upon reception of the key input signal, controller 111 ends the intercommunication operation. If no intercom call termination signal is received, the procedure returns to step 510. Meanwhile, controller 111 performs a speech mode between portable units (step 514), and checks whether a call termination signal is received from keypad 118 (step 516). Upon input of the call termination signal, controller 111 terminates the intercommunication and, otherwise, the procedure goes back to step 514.

Figure 9:
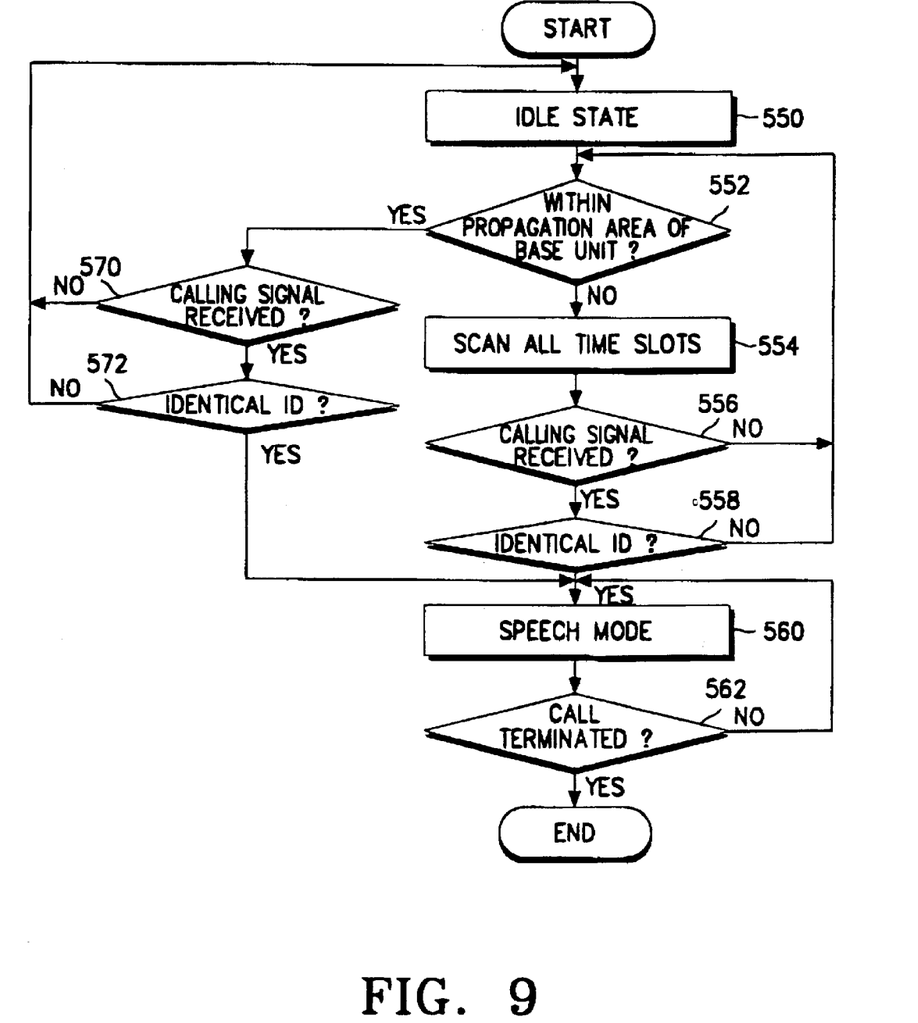
FIG. 9 is a flowchart for controlling a portable unit to receive an intercom call signal according to an embodiment of the present invention.

FIG. 9 is a flowchart for controlling a portable unit to receive an intercom signal according to an embodiment of the present invention. The controlling of the portable unit will be described in detail with reference to FIGS. 1, 2, and 9. The portable unit is configured as shown in FIG. 2.

The controller 111 is placed in an idle state (step 550), and then determines whether or not the portable unit is located within the propagation area of the base unit (step 552). The determination is a procedure in which a signal in a predetermined frequency band is received and checked by controlling duplexer 112, radio receiver 113, and frequency synthesizer 114 in one of the above-mentioned methods. As stated above with respect to FIG. 1, the third and fourth portable units CP_3 and CP_4 are out of the propagation area.

Returning to FIG. 9, if it is determined that the portable unit is located beyond the propagation area, controller 111 proceeds to step 554. Otherwise, controller 111 proceeds to step 570. In step 554, controller 111 checks all the time slots in the predetermined frequency band by controlling duplexer 112, radio receiver 113, and frequency synthesizer 114. That is, controller 111 scans all the time slots of its transmission and reception times Tx and Rx, respectively, of the available channels or a specific channel selected from the available channels. For example, a DECT (Digital European Cordless Telephone) terminal based on TDMA can use ten different channels of corresponding frequencies, where each channel is assigned twelve time slots for transmission and reception times, respectively. Therefore, in order to check all the channels of the DECT terminal, at least 240 time slots should be scanned.

After all the time slots are scanned in step 554, controller 111 proceeds to step 556 upon the input of a radio signal via radio receiver 113. In step 556, controller 111 determines whether or not the input signal is a calling signal. If so, the method proceeds to step 558. Otherwise, a return is made to step 552.

In step 558, controller 111 determines whether or not an ID of the input calling signal is identical to that of the portable unit stored in memory 117. If the IDs are different, then controller 111 returns to step 552. However, if the IDs are identical, then controller 111 outputs a ring signal to notify a user of the presence of an incoming call. If the user requests for a communication by depressing a communication key (not shown in FIG. 2) in keypad 118, controller 111 performs a speech mode in step 560.

The controller 111 then determines whether or not a call termination signal is received in radio receiver 118, and terminates the speech mode upon reception of the call termination signal (step 562). In the absence of the call termination signal, controller 111 continues the speech mode (step 560). The call termination signal is generated by the input of a communication key from keypad 118, power-off, or depressing a particular key for call termination.

Meanwhile, if the portable unit proves to be within the propagation area in step 552, controller 111 determines whether or not a calling signal is received in radio receiver 113 (step 570). If so, the method proceeds to step 572. Otherwise, a return is made to step 550.

In step 572, controller 111 determines whether or not an ID of the input calling signal is identical to the ID of the portable unit stored in memory 117. If so, then controller 111 proceeds to step 560. Otherwise, controller 111 returns to step 550.

As described above, since a direct intercommunication can be conducted between portable units without the interposition of a base unit, a cordless portable unit can be used as a walkie-talkie when a user is outdoors.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. An intercommunication method between portable units in a TDMA (Time Division Multiple Access) cordless telephone system, comprising the steps of:

determining whether a portable unit is positioned in a propagation area of a base unit upon an intercom request from the portable unit;

performing a time reversal when the portable unit is out of the propagation area of the base unit, and designating time slots for an intercommunication between the portable unit and a portable unit to be called; and transmitting an intercom call signal and performing a speech mode in the designated time slots.

2. The intercommunication method of claim 1, further comprising the steps of:

reading a portable unit registration table stored in a memory;

displaying all other portable units except for a calling portable unit stored in the read portable unit registration table on a display; and transmitting an intercom call signal to a selected portable unit upon reception of a signal representing selection of the portable unit.

3. The intercommunication method of claim 2, further comprising the step of recovering transmission and reception times by reversing previously reversed time slots when a call termination signal is received during a speech mode.

4. The intercommunication method of claim 1, further comprising the step of recovering transmission and reception times by reversing previously reversed time slots when a call termination signal is received during a speech mode.

5. The intercommunication method of claim 1, further comprising the steps of:

determing whether an identification (ID) of the intercom call signal is identical to the ID of the portable unit; and performing the speech mode, when the ID of the intercom call signal is identical to the ID of the portable unit.

6. An intercommunication method between portable units in a TDMA cordless telephone system, comprising the steps of:

determining whether a portable unit is positioned in a propagation area of a base unit upon an intercom request from the portable unit;

designating time slots for an intercommunication between the portable unit and a portable unit to be called when the portable unit is out of the propagation area of the base unit; and transmitting an intercom call signal and performing a speech mode in the designated time slots.

7. The intercommunication method of claim 6, further comprising the steps of:

reading a portable unit registration table stored in a memory;

displaying all other portable units except for a calling portable unit stored in the read portable unit registration table on a display; and transmitting an intercom call signal to a selected portable unit upon reception of a signal representing selection of the portable unit.

8. An apparatus for performing intercommunication between portable units in a TDMA (Time Division Multiple Access) cordless telephone system comprising:

means for determining whether a portable unit is positioned within a propagation area of a base unit:

means for performing a time reversal of time slots when the portable unit is out of the propagation area of the base unit;

means for designating the reversed time slots for intercommunication between the portable unit and a portable unit being called; and means for transmitting an intercom call signal and performing a speech mode in the designated time slots.

9. The apparatus as claimed in claim 8, further comprising:

means for reading a portable unit registration table stored in a memory;

means for displaying all other portable units except for a calling portable unit stored in the read portable unit registration table on a display; and means for transmitting an intercom call signal to a selected portable unit upon reception of a signal representing selection of the portable unit.

10. The apparatus as claimed in claim 8, further comprising:

means for determing whether an identification (ID) of the intercom call signal is identical to the ID of the portable unit; and means for performing the speech mode, when the ID of the intercom call signal is identical to the ID of the portable unit.

* * * * *